(12) United States Patent
Chen et al.

(10) Patent No.: US 12,154,729 B2
(45) Date of Patent: Nov. 26, 2024

(54) LIGHTING KEYBOARD AND BACKLIGHT MODULE FOR THE SAME

(71) Applicant: Darfon Electronics Corp., Taoyuan (TW)

(72) Inventors: Yen-Chang Chen, Taoyuan (TW); Po-Yueh Chou, Taoyuan (TW)

(73) Assignee: Darfon Electronics Corp.

( * ) Notice: Subject to any disclaimer, the term of this patent is extended or adjusted under 35 U.S.C. 154(b) by 0 days.

(21) Appl. No.: 18/398,285

(22) Filed: Dec. 28, 2023

(65) Prior Publication Data

US 2024/0274379 A1   Aug. 15, 2024

Related U.S. Application Data

(60) Provisional application No. 63/444,573, filed on Feb. 10, 2023.

(30) Foreign Application Priority Data

Nov. 22, 2023   (TW) .................................. 112145095

(51) Int. Cl.
*H01H 13/00* (2006.01)
*F21V 8/00* (2006.01)
(Continued)

(52) U.S. Cl.
CPC ......... *H01H 13/023* (2013.01); *G02B 6/0035* (2013.01); *G02B 6/0085* (2013.01);
(Continued)

(58) Field of Classification Search
CPC .. H01H 13/023; G02B 6/0035; G02B 6/0085; G06F 3/0202
See application file for complete search history.

(56) References Cited

U.S. PATENT DOCUMENTS

| 9,875,864 B2 | 1/2018 | Chih et al. |
| 11,507,154 B2 | 11/2022 | Schwager et al. |

(Continued)

FOREIGN PATENT DOCUMENTS

| CN | 112735890 A | 4/2021 |
| JP | 2012155375 A | 8/2012 |

(Continued)

*Primary Examiner* — Gerald J Sufleta, II

(57) ABSTRACT

A backlight module for a lighting keyboard including at least two heat-dissipating keys comprises a reflective layer, a light guide panel and a shielding sheet and has at least two penetration channels. The reflective layer, the light guide panel and the shielding sheet are stacked up and down. The penetration channels symmetrically correspond to the heat-dissipating keys respectively and penetrate the reflective layer, the light guide panel and the shielding sheet. The penetration channels are respectively provided with one light-reducing pattern at their periphery for blocking light. At least two diffusion patterns are arranged adjacent to the light-reducing patterns for guiding light to illuminate the heat-dissipating keys. The light-reducing patterns and the diffusion patterns form at least two heat-reducing optical pattern groups respectively. The heat-reducing optical pattern groups respectively corresponding to the heat-dissipating keys have identical patterns.

20 Claims, 6 Drawing Sheets

(51) Int. Cl.
 *G06F 3/02* (2006.01)
 *H01H 13/02* (2006.01)
(52) U.S. Cl.
 CPC ..... *G06F 3/0202* (2013.01); *H01H 2219/056* (2013.01); *H01H 2219/06* (2013.01); *H01H 2219/062* (2013.01)

(56) References Cited

U.S. PATENT DOCUMENTS

| | | |
|---|---|---|
| 11,515,107 B2 | 11/2022 | Chen |
| 2018/0301299 A1* | 10/2018 | Lin ........................ H01H 13/70 |
| 2021/0012984 A1* | 1/2021 | Chen ...................... H01H 13/83 |
| 2021/0034165 A1* | 2/2021 | Shipman ................ H01H 13/83 |
| 2024/0038459 A1* | 2/2024 | Chen ....................... G06F 1/169 |

FOREIGN PATENT DOCUMENTS

| | | |
|---|---|---|
| TW | I631587 B | 8/2018 |
| TW | I652711 B | 3/2019 |
| TW | M596891 U | 6/2020 |
| TW | I725894 B | 4/2021 |
| TW | M622001 U | 1/2022 |
| TW | I765552 B | 5/2022 |
| TW | I778398 B | 9/2022 |
| TW | I780860 B | 10/2022 |
| TW | I789648 B | 1/2023 |
| TW | I812041 B | 8/2023 |
| TW | I830439 B | 1/2024 |

\* cited by examiner

LIGHTING KEYBOARD AND BACKLIGHT MODULE FOR THE SAME

This application claims the benefit of U.S. Provisional Application No. 63/444,573, filed on Feb. 10, 2023, and the benefit of Taiwan application Serial No. 112145095, filed on Nov. 22, 2023. The contents of these applications are incorporated herein by reference.

FIELD OF THE INVENTION

The invention relates to a lighting keyboard and a backlight module for the same.

DESCRIPTION OF THE PRIOR ART

As technology advances, there are many types of keyboards in use. Users pay much more attention to visual effect of keyboard except basic input function while choosing keyboard. So far a lighting keyboard has been developed. The lighting keyboard attracts users in visual effect and can be used in darkness. When a conventional luminous keyboard is used in a thin computing device, a large number of components are stacked in a small space of the computing device, thereby raising a prominent heat dissipation problem. Thus, there is a need to improve heat dissipation efficiency of the computing devices, and keyboard modules embedded them need to be correspondingly adjusted as well.

SUMMARY OF THE INVENTION

The invention is directed to provide a lighting keyboard and a backlight module for the same that are able to enhance the heat dissipation efficiency.

According to an aspect of the invention, a backlight module for a lighting keyboard comprises a reflective layer, a light guide panel and a shielding sheet. The lighting keyboard includes at least two heat-dissipating keys. The reflective layer, the light guide panel and the shielding sheet are stacked up and down. The backlight module has at least two penetration channels. The at least two penetration channels symmetrically correspond to the heat-dissipating keys respectively and penetrate the reflective layer, the light guide panel and the shielding sheet. The at least two penetration channels are respectively provided with one light-reducing pattern at their periphery for blocking light. At least two diffusion patterns are arranged adjacent to the light-reducing patterns for guiding light to illuminate the at least two heat-dissipating keys. The at least two light-reducing patterns and the at least two diffusion patterns form at least two heat-reducing optical pattern groups respectively. The at least two heat-reducing optical pattern groups respectively corresponding to the at least two heat-dissipating keys have identical patterns.

According to another aspect of the invention, a lighting keyboard comprises at least one heat-dissipating key, a backlight module and a key circuit board. The at least one heat-dissipating key has a keycap projected area. The backlight module includes a reflective layer, a light guide panel and a shielding sheet that are stacked up and down. The backlight module has at least one penetration channel to correspond to the at least one heat-dissipating key. The at least one penetration channel penetrates the reflective layer, the light guide panel and the shielding sheet. A light-reducing pattern is provided at periphery of the at least one penetration channel for blocking light. At least one diffusion pattern is provided near the light-reducing pattern for guiding light to illuminate the at least one heat-dissipating key. The key circuit board is disposed above the backlight module and includes an electric circuit portion. The electric circuit portion extends across a range of the keycap projected area. From top view, the light-reducing pattern and the at least one diffusion pattern are located on the same side of the electric circuit portion.

According to another aspect of the invention, a backlight module for a lighting keyboard comprises a reflective layer, a light guide panel and a shielding sheet. The lighting keyboard includes a first heat-dissipating key and a second heat-dissipating key. The first heat-dissipating key and the second heat-dissipating key are adjacent in a first direction but not aligned in a second direction. The reflective layer, the light guide panel and the shielding sheet are stacked up and down. The backlight module has two penetration channels symmetrically corresponding to the first heat-dissipating key and the second heat-dissipating key. The two penetration channels penetrate the reflective layer, the light guide panel and the shielding sheet. The two penetration channels are respectively provided with a left heat-reducing optical pattern group and a right heat-reducing optical pattern group at their periphery to correspond to each of the first heat-dissipating key and the second heat-dissipating key. The right heat-reducing optical pattern group corresponding to the first heat-dissipating key at least partially overlaps the left heat-reducing optical pattern group corresponding to the second heat-dissipating key in the first direction.

According to another aspect of the invention, a lighting keyboard comprises a first heat-dissipating key, a second heat-dissipating key, a backlight module and a key circuit board. The first heat-dissipating key and the second heat-dissipating key are adjacent in a first direction but not aligned in a second direction. The backlight module includes a reflective layer, a light guide panel and a shielding sheet that are stacked up and down, and has two penetration channels to symmetrically correspond to the first heat-dissipating key and the second heat-dissipating key. The two penetration channels are respectively provided with one right heat-reducing optical pattern group. Each of the right heat-reducing optical pattern groups corresponds to each of the first heat-dissipating key and the second heat-dissipating key. The key circuit board is disposed above the backlight module and includes two switch pads to correspond to each of the first heat-dissipating key and the second heat-dissipating key. The right heat-reducing optical pattern group corresponding to the first heat-dissipating key at least partially overlaps the switch pad corresponding to the second heat-dissipating key in the first direction.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
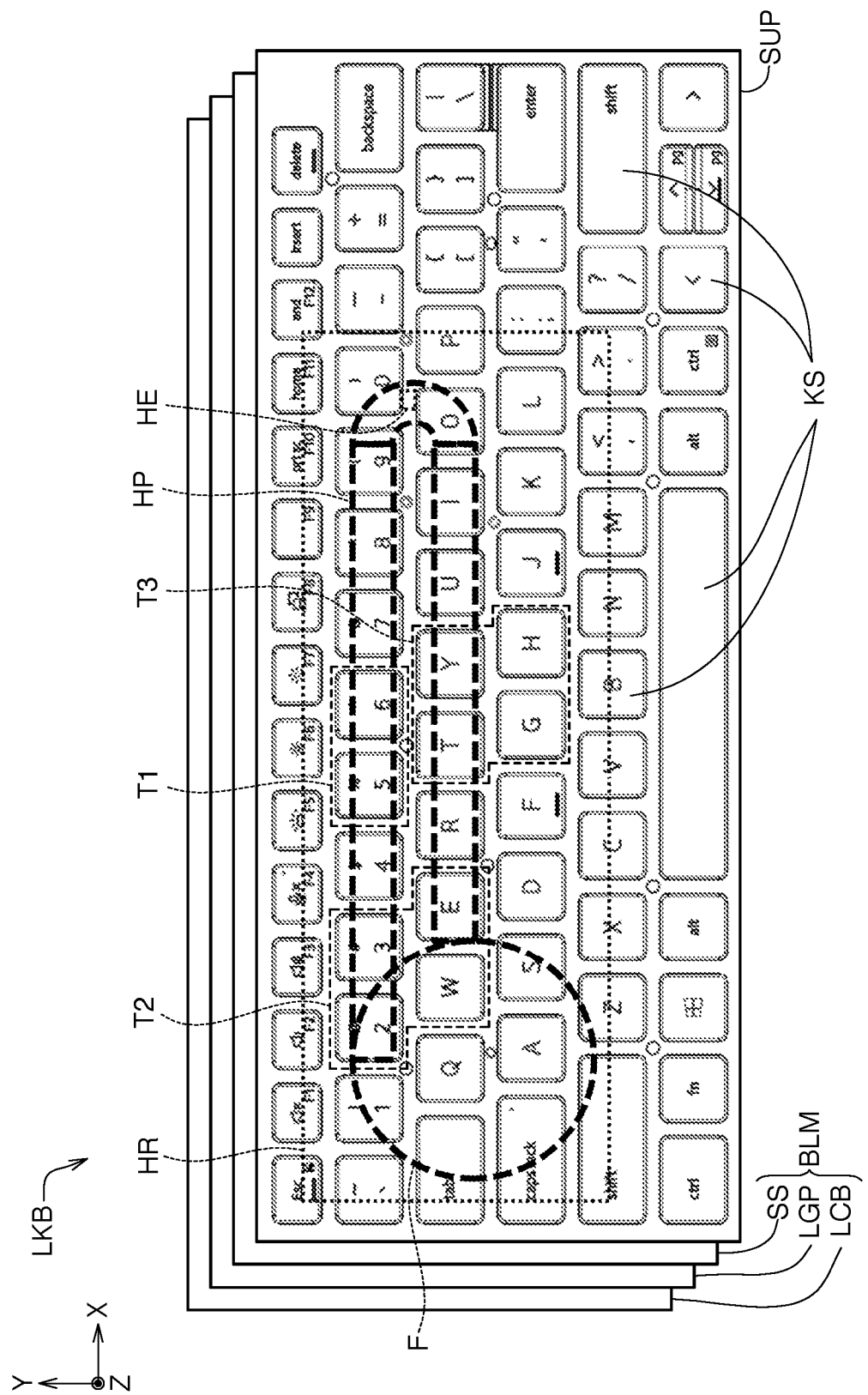
FIG. 1 is a schematic view illustrating a lighting keyboard according to an embodiment of the invention.

Referring to FIG. 1, FIG. 1 is a schematic view illustrating a lighting keyboard LKB according to an embodiment of the invention.

Figure 2:
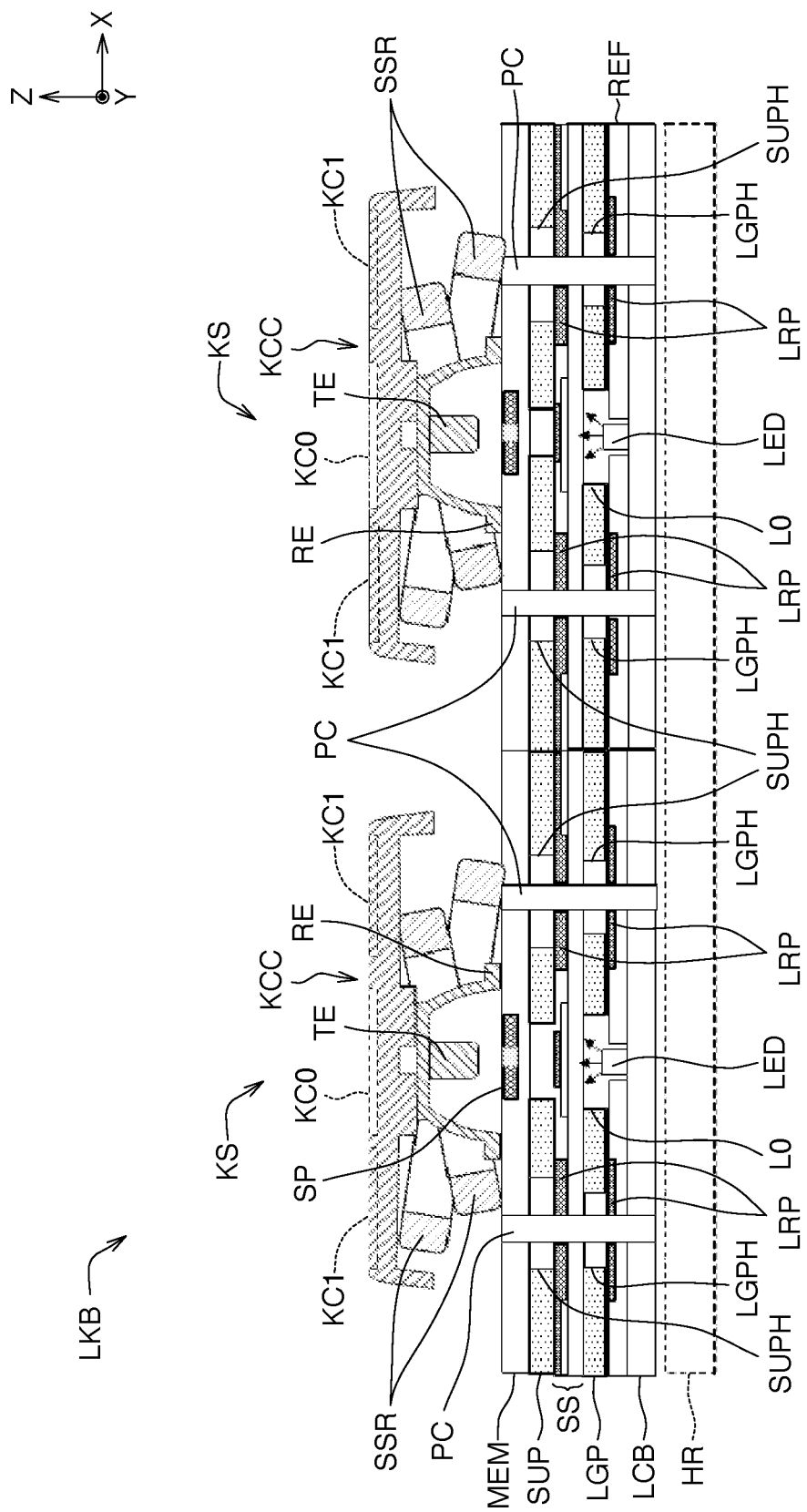
FIG. 2 is a partial sectional view illustrating the lighting keyboard shown in FIG. 1.
Figure 3:
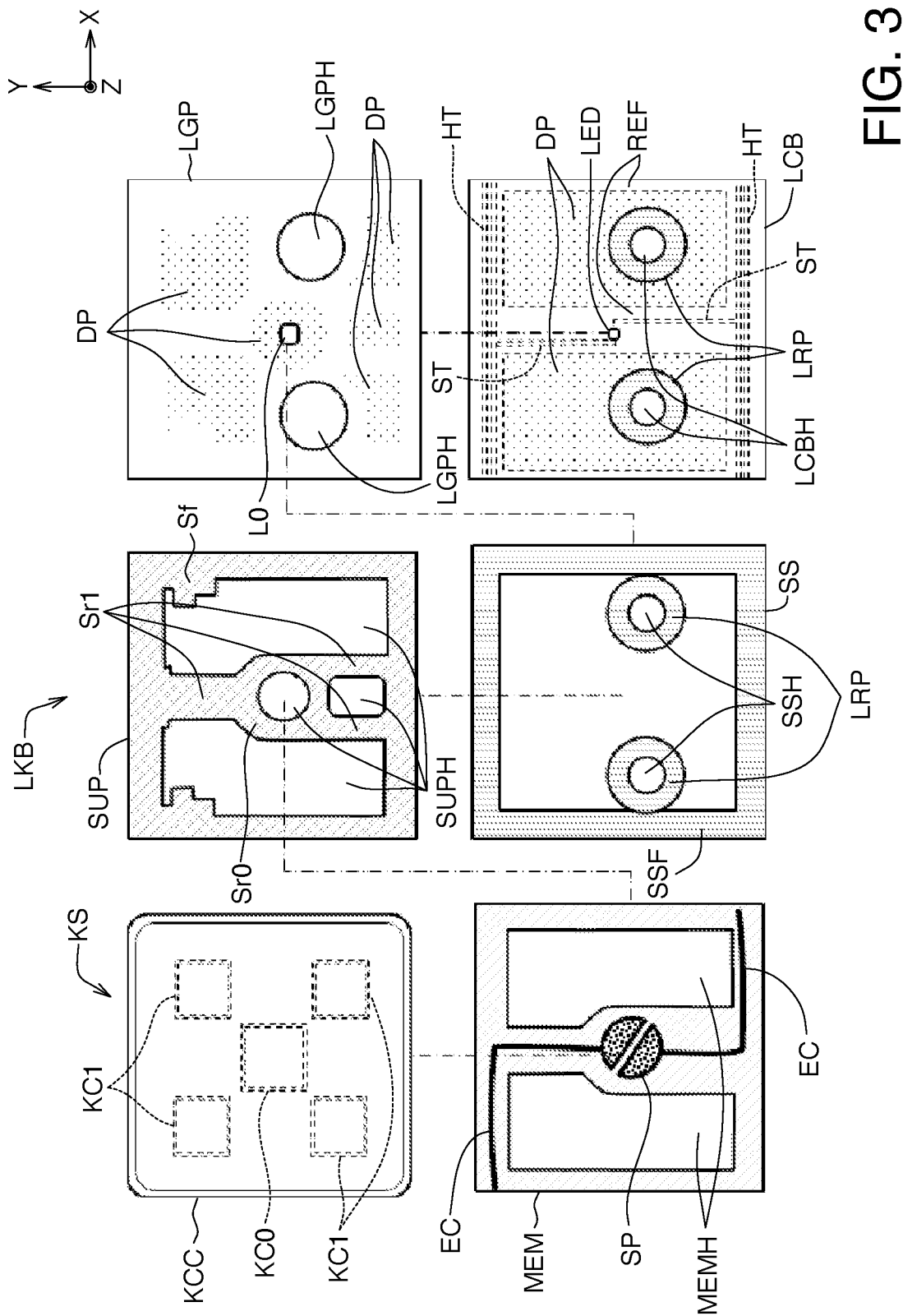
FIG. 3 is a partial exploded view illustrating the lighting keyboard shown in FIG. 1.

As shown in FIG. 1, there are a heating element HE (e.g. integrated circuit or electronic element), a fan F and a heat pipe HP below the lighting keyboard LKB. Heat dissipation are needed at a heat region HR where the heating element HE, the fan F and the heat pipe HP overlap with the lighting keyboard LKB. The lighting keyboard LKB comprises a backlight module BLM and a plurality of heat-dissipating keys KS. A support plate SUP is disposed on the backlight module BLM and the heat-dissipating keys KS are disposed on the support plate SUP. In general, the heat-dissipating keys KS may comprise square keys and multiple keys (e.g. space key). It should be noted that the number, size and arrangement of the heat-dissipating keys KS may be determined according to practical applications, so the invention is not limited to the embodiment shown in the figure. The backlight module BLM comprises a lighting board LCB, a light guide panel LGP and a shielding sheet SS. The light guide panel LGP is configured in optical communication with at least one light emitting unit LED on the lighting board LCB, as shown in FIG. 2 and FIG. 3. The lighting board LCB, the light guide panel LGP and the shielding sheet SS are stacked up and down (or may be referred to as stacked vertically), namely the light guide panel LGP is disposed on the lighting board LCB and the shielding sheet SS is disposed on the light guide panel LGP.

Further referring to FIGS. 2 to 3, FIG. 2 is a partial sectional view illustrating the lighting keyboard LKB shown in FIG. 1, FIG. 3 is a exploded view illustrating layers of a single heat-dissipating key KS of the lighting keyboard LKB shown in FIG. 1, wherein a support mechanism SSR, a trigger element TE and a restoration member RE are omitted in FIG. 3.

In this embodiment, each heat-dissipating key KS on the lighting keyboard LKB corresponds to at least one light emitting unit (e.g. LED) on the lighting board LCB of the backlight module BLM. In other possible embodiments, each heat-dissipating key KS on the lighting keyboard LKB corresponds to a light bar on the lighting board LCB of the backlight module BLM. The backlight module BLM may have a plurality of penetration channels PC symmetrically to correspond to the heat-dissipating keys KS respectively, so as to allow hot air and cold air to flow and exchange through penetration channels PC. The penetration channels PC penetrate the lighting board LCB, the light guide panel LGP and the shielding sheet SS. When the lighting board LCB is a small-sized light bar, the penetration channels PC may not be able to penetrate the lighting board LCB. In such case, the penetration channels PC penetrate the shielding sheet SS, the light guide panel LGP and a reflective layer REF on top of the light bar functioning as the lighting board LCB. As shown in FIG. 2, two penetration channels PC are provided below a single heat-dissipating key KS, but the invention is not so limited. The penetration channels PC also penetrate the key circuit board MEM, the support plate SUP and a reflective layer REF. That is to say, the penetration channel PC is formed by stacking the perforations of layers of the key circuit board MEM, the support plate SUP, the shielding sheet SS, the light guide panel LGP, the reflective layer REF and the lighting board LCB in the Z direction, wherein these perforations at least partially overlaps one another. The perforation of the light guide panel LGP can be larger than the perforations of the reflective layer REF and the shielding sheet SS. The penetration channels PC are configured to be heat-dissipating channels for the heat region HR.

The heat-dissipating key KS comprises a keycap KCC, the support mechanism SSR, the key circuit board MEM and the support plate SUP. The keycap KCC is disposed with respect to the support plate SUP. The keycap KCC has an inner outlet KC0, such that the light emitted by a light emitting unit LED may be projected from the inner outlet KC0 to illuminate the character on the keycap KCC. The keycap KCC further has a plurality of outer outlets KC1 being adjacent to the inner outlet KC0. As shown in FIG. 2, the positions of the outer outlets KC1 correspond to the positions of the penetration channels PC, such that the penetration channels PC can be disposed below an opaque area, thereby reducing the upward light leakage. The support mechanism SSR is disposed between the keycap KCC and the support plate SUP. When the keycap KCC is pressed, the keycap KCC will move vertically toward the support plate SUP along with the support mechanism SSR. Furthermore, the restoration member RE may be further disposed between the keycap KCC and the support plate SUP, wherein the restoration member RE may be, but is not limited to, a rubber dome. The keycap KCC, the support mechanism SSR, the restoration member RE, the key circuit board MEM and the support plate SUP may be mainly formed by a non-reflective or low-reflective material or a light-absorbing material, thereby reducing the downward light reflection.

The key circuit board MEM is disposed above the backlight module BLM. Furthermore, a switch pad SP corresponding to the trigger element TE of the heat-dissipating key KS may be provided on the key circuit board MEM, wherein the switch pad SP may be, but is not limited to, a membrane switch. In this embodiment, the key circuit board MEM comprises an electric circuit portion EC, a plurality of membrane holes MEMH and the switch pad SP. The membrane hole MEMH constitutes a part of the penetration channel PC. The switch pad SP is connected to the electric circuit portion EC and is located between the membrane holes MEMH. Furthermore, the key circuit board MEM can be coated with a light-absorbing material around the penetration channel PC, thereby reducing the upward light leakage.

Each of the heat-dissipating keys KS comprises a part of the support plate SUP. In this embodiment, the support plate SUP may include a surrounding rib Sr0, a plurality of bridge ribs Sr1 and a support frame Sf, wherein the bridge ribs Sr1 connect the surrounding rib Sr0 and the support frame Sf, and there are a plurality of support plate holes SUPH between the bridge ribs Sr1, the surrounding rib Sr0 and the support frame Sf. The support plate holes SUPH on two sides are a part of the penetration channel PC. The switch pad SP of the key circuit board MEM is disposed with respect to a support plate hole SUPH in the center of the support plate SUP, such that the switch pad SP may partially enter the support plate hole SUPH in the center of the support plate SUP without interfering with the shielding sheet SS and the light emitting unit LED below the shielding sheet SS.

The shielding sheet SS is disposed below the support plate SUP. IN this embodiment, the shielding sheet SS has a plurality of shielding sheet holes SSH, a plurality of light-reducing patterns LRP and a shielding frame SSF, with the rest of the shielding sheet SS remaining a rectangular light permeable area surrounded by the shielding frame SSF. The rectangular light permeable area has four corners corresponding to the four corners of shielding frame SSF and to the four corners of the keycap KCC. The light permeable area allow light to pass through upwards and illuminate the keycap KCC. The shielding sheet holes SSH are respectively located in the light-reducing patterns LRP, and the shielding frame SSF corresponds to the support frame Sf of the support plate SUP. The shielding sheet hole SSH constitutes a part of the penetration channel PC. The light-reducing pattern LRP of the shielding sheet SS is provided at periphery of each penetration channel PC for blocking light. The light-reducing pattern LRP can be a ring-shaped black ink being coated on the top surface and/or the bottom surface of the shielding sheet SS.

The light guide panel LGP is disposed below the shielding sheet SS. In this embodiment, the light guide panel LGP has a light guide hole L0, a plurality of light guide panel holes LGPH and a plurality of diffusion patterns DP. The light emitting unit LED is located in the light guide hole L0. The top surface and/or the bottom surface of the light guide panel LGP close to the light guide hole L0 may have adhesive around the light guide hole L0 to adhere the shielding sheet SS and/or the lighting board LCB respectively. The position of the light guide panel hole LGPH corresponds to the position of the shielding sheet holes SSH and constitutes a part of the penetration channel PC. The diffusion patterns DP may be formed by microstructure regions, and the positions thereof correspond to the positions of the support plate holes SUPH, and the light permeable area of shielding sheet SS so as to guide the light transmitted in the light guide panel LGP to emit out upward. From top view in the Z direction, the diffusion patterns DP of the light guide panel LGP can be provided near the light-reducing pattern LRP of the shielding sheet SS to guide the light of the light emitting unit LED to illuminate the corresponding heat-dissipating key KS. The diffusion patterns DP of the light guide panel LGP each is configured at a position corresponding to the four corners of shielding frame SSF, the four corners of the light permeable area of shielding sheet SS, and corresponding to the four corners of the keycap KCC, thereby facilitating the light uniformity along the peripheral of keycap KCC, including four edges and four corners. Furthermore, either realizing the light-reducing pattern LRP by a ring-shaped black ink coated on the top surface or the bottom surface of the light guide panel LGP at periphery of the penetration channel PC, or coating a light-absorbing material on the hole wall of the light guide panel hole LGPH, or providing adhesive on the top surface and the bottom surface of the light guide panel hole LGPH near periphery of the penetration channel PC can all reduce the upward or downward light leaking from the light guide panel LGP in the penetration channel PC.

The lighting board LCB is disposed below the light guide panel LGP and may include the reflective layer REF on top of the lighting board LCB. In this embodiment, the lighting board LCB comprises the light emitting unit LED, a plurality of lighting board holes LCBH, a plurality of light-reducing patterns LRP, a plurality of diffusion patterns DP, a plurality of main traces HT and a plurality of sub-traces ST. The light-reducing patterns LRP may be realized on the top surface of lighting board LCB, or on the top surface of reflective layer REF, especially when lighting board LCB is a small-sized light bar. The light emitting unit LED is connected between two sub-traces ST, and the light emitting unit LED is connected between two main traces HT through the two sub-traces ST. In this embodiment, the main traces HT and the sub-traces ST constitute the lighting circuit of the light emitting unit LED, the main trace HT may be a main drive trace, and the sub-trace ST may be a sub-drive trace. The light emitting unit LED may be a white LED or a combination of RGB LEDs according to practical applications. In general, the main trace HT has a larger cross-sectional area and may cross a plurality of heat-dissipating keys KS. The position of the lighting board hole LCBH corresponds to the positions of the light guide panel hole LGPH and the shielding sheet holes SSH, and constitutes a part of the penetration channel PC. The light-reducing pattern LRP can be a ring-shaped black ink being formed in the reflective layer REF to be disposed at periphery of the penetration channel PC. The diffusion patterns DP may also be formed by the microstructure regions and can be formed in the reflective layer REF, and the diffusion patterns DP are disposed near the light-reducing pattern LRP, so as to guide the light of the light emitting unit LED to illuminate the corresponding heat-dissipating key KS. The diffusion patterns may be formed on the light guide panel LGP and/or the lighting board LCB.

Figure 4:
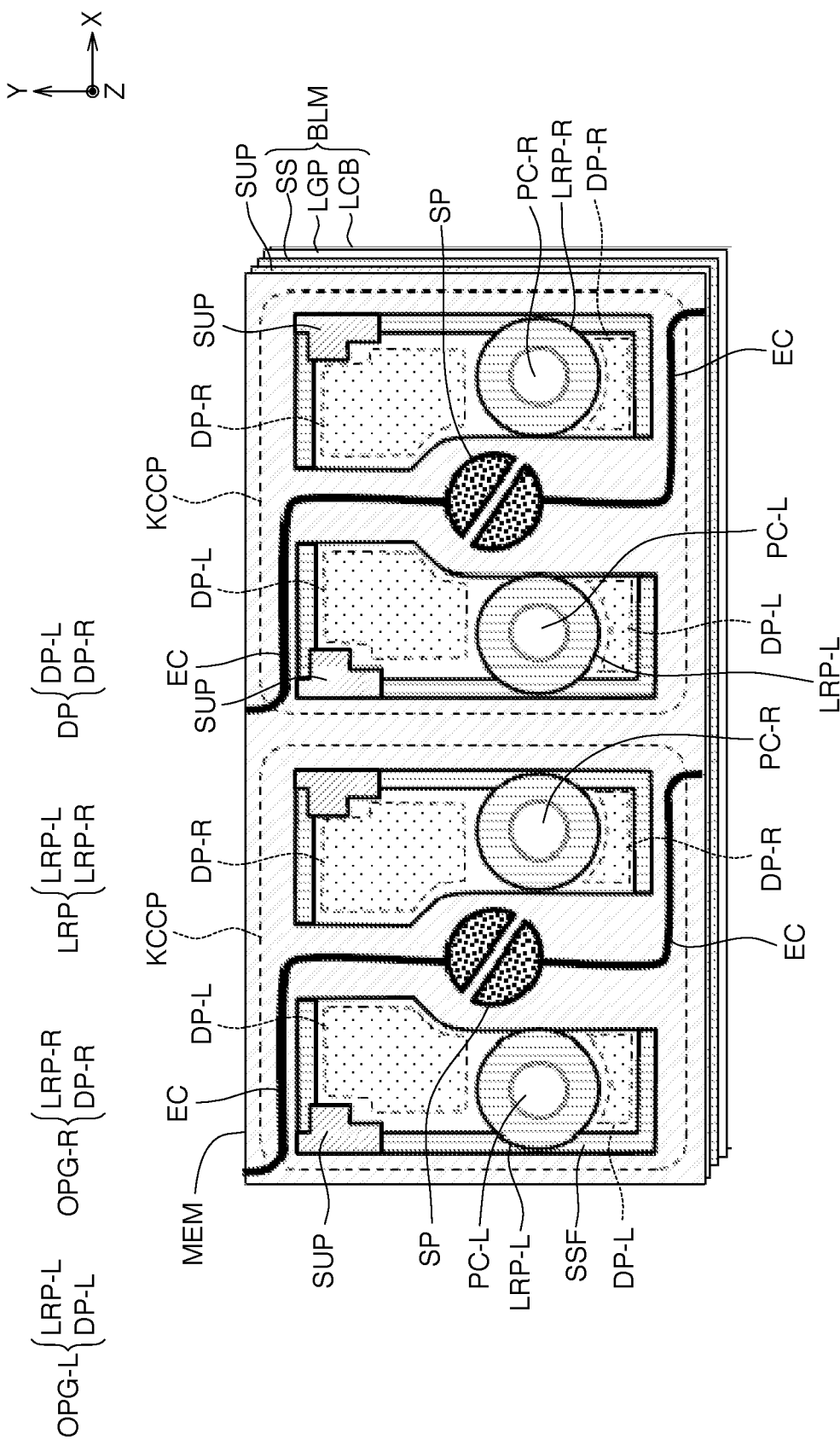
FIG. 4 is a partial top view illustrating the lighting keyboard shown in FIG. 1.

Further referring to FIG. 4, FIG. 4 is a top view illustrating a partial region T1 of the lighting keyboard LKB shown in FIG. 1, wherein the keycap KCC, the support mechanism SSR, the trigger element TE and the restoration member RE are omitted in FIG. 4.

Two heat-dissipating keys KS in the partial region T1 respectively have a keycap projected area KCCP of the keycap KCC, and each electric circuit portion of the key circuit board MEM extends across a range of the keycap projected area KCCP. Moreover, as shown in FIGS. 3 and 4, a rib portion (comprising the surrounding rib Sr0 and the bridge ribs Sr1) of the support plate SUP extends across the range of the keycap projected area KCCP. Corresponding to a single heat-dissipating keys KS, the penetration channel PC may include a left penetration channel PC-L and a right penetration channel PC-R. Two left penetration channels PC-L symmetrically correspond to two heat-dissipating keys KS and penetrate the lighting board LCB, the light guide panel LGP and the shielding sheet SS. Two right penetration channels PC-R also symmetrically correspond to the two heat-dissipating keys KS and penetrate the lighting board LCB, light guide panel LGP and shielding sheeting SS. Each of the two left penetration channels PC-L is provided with a left light-reducing pattern LRP-L at their periphery. Two left diffusion patterns DP-L are provided on the upper side and the lower side of each left light-reducing pattern LRP-L. Each of the two right penetration channels PC-R is provided with a right light-reducing pattern LRP-R at its periphery. Two right diffusion patterns DP-R are provided on the upper side and the lower side of each right light-reducing pattern LRP-R. That is, the light-reducing pattern LRP may include the left light-reducing pattern LRP-L and the right light-reducing pattern LRP-R to correspond to a single heat-dissipating key KS, and the diffusion pattern DP may include the left diffusion pattern DP-L and the right diffusion pattern DP-R to correspond to a single heat-dissipating key KS. Two diffusion patterns DP are provided near each of light-reducing patterns LRP. From top view in the Z direction, each of the light-reducing patterns LRP is located between two adjacent diffusion patterns DP.

The left light-reducing pattern LRP-L and the left diffusion pattern DP-L may constitute a left heat-reducing optical pattern group OPG-L, and the right light-reducing pattern LRP-R and the right diffusion pattern DP-R may constitute a right heat-reducing optical pattern group OPG-R. In this embodiment, the backlight module BLM has two penetration channels PC (i.e. one left penetration channel PC-L and one right penetration channel PC-R) to correspond to each heat-dissipating key KS. The left heat-reducing optical pattern group OPG-L and the right heat-reducing optical pattern group OPG-R, corresponding to each heat-dissipating key KS, are symmetrically located on opposite sides of each keycap projected area KCCP. In this embodiment, the two left heat-reducing optical pattern groups OPG-L corresponding to the two heat-dissipating keys KS have identical patterns, and the two right heat-reducing optical pattern groups OPG-R corresponding to the two heat-dissipating keys KS also have identical patterns. In practical applications, the electric circuit portion EC of the key circuit board MEM board of a square key may not be light-transparent and is not suitable to be above the diffusion pattern DP, so a longitudinal extending part of the electric circuit portion EC is preferably located between the left heat-reducing optical pattern group OPG-L and the right heat-reducing optical pattern group OPG-R corresponding to a single heat-dissipating key KS.

In practical applications, the rib portion (comprising the surrounding rib Sr0 and the bridge ribs Sr1) of the support plate SUP of a square key may not be light-transparent and is not suitable to be above the diffusion pattern DP, so the surrounding rib Sr0 and the bridge ribs Sr1 of the support plate SUP are preferably located between the left heat-reducing optical pattern group OPG-L and the right heat-reducing optical pattern group OPG-R corresponding to a single heat-dissipating key KS. That is, from top view in the Z direction, the left light-reducing pattern LRP-L and the left diffusion pattern DP-L are located on the same side of the electric circuit portion EC and on the same side of the rib portion (comprising the surrounding rib Sr0 and the bridge ribs Sr1) of the support plate SUP; the right light-reducing pattern LRP-R and the right diffusion pattern DP-R are located on the same side of the electric circuit portion EC and on the same side of the rib portion (comprising the surrounding rib Sr0 and the bridge ribs Sr1) of the support plate SUP. Moreover, from top view in the Z direction, the left light-reducing pattern LRP-L and the right light-reducing pattern LRP-R are located on opposite sides of the electric circuit portion EC and on opposite sides of the rib portion (comprising the surrounding rib Sr0 and the bridge ribs Sr1) of the support plate SUP; the left diffusion pattern DP-L and the right diffusion pattern DP-R are located on opposite sides of the electric circuit portion EC and on opposite sides of the rib portion (comprising the surrounding rib Sr0 and the bridge ribs Sr1) of the support plate SUP.

Figure 5:
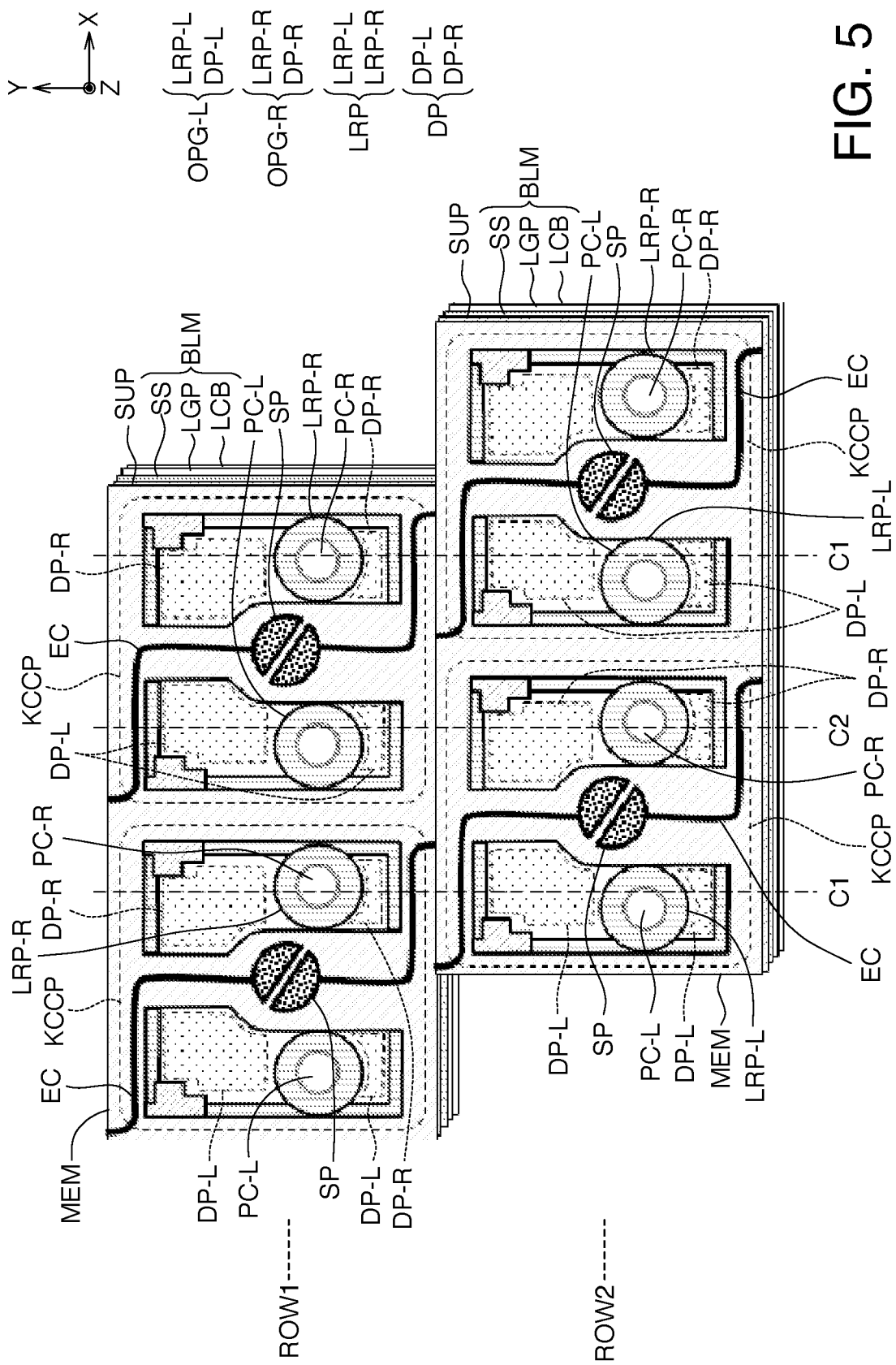
FIG. 5 is a partial top view illustrating the lighting keyboard shown in FIG. 1.

Further referring to FIG. 5, FIG. 5 is a top view illustrating a partial region T2 of the lighting keyboard LKB shown in FIG. 1, wherein the keycap KCC, the support mechanism SSR, the trigger element TE and the restoration member RE are omitted in FIG. 5. The four heat-dissipating keys KS in the partial area T2 can also have all the features described above, which will not repeated herein. The description regarding FIG. 5 mainly focuses on the features of the heat-dissipating keys KS in different rows of the lighting keyboard LKB.

As shown in FIG. 5, the heat-dissipating key KS located on the left side of an top row ROW1 and the heat-dissipating key KS located on the left side of a middle row ROW2 are adjacent in the Y direction but not aligned in the X direction; the heat-dissipating key KS located on the right side of the top row ROW1 and the heat-dissipating key KS located on the right side of the middle row ROW2 are adjacent in the Y direction but is not aligned in the X direction. The right heat-reducing optical pattern group OPG-R (constituted by the right light-reducing pattern LRP-R and the right diffusion pattern DP-R) corresponding to the heat-dissipating key KS located on the left side of the top row ROW1 at least partially overlaps the left heat-reducing optical pattern group OPG-L (constituted by the left light-reducing pattern LRP-L and the left diffusion pattern DP-L) of the heat-dissipating key KS located on the left side of the middle row ROW2 in the Y direction. That is, these two partially overlapping heat-reducing optical pattern groups form an alignment line C1. Furthermore, the right heat-reducing optical pattern group OPG-R (constituted by the right light-reducing pattern LRP-R and the right diffusion pattern DP-R) corresponding to the heat-dissipating key KS located on the right side of the top row ROW1 at least partially overlaps the left heat-reducing optical pattern group OPG-L (constituted by the left light-reducing pattern LRP-L and the left diffusion pattern DP-L) of the heat-dissipating key KS located on the right side of the middle row ROW2 in the Y direction. That is, these two partially overlapping heat-reducing optical pattern groups also form the alignment line C1.

Furthermore, the left heat-reducing optical pattern group OPG-L (constituted by the left light-reducing pattern LRP-L and the left diffusion pattern DP-L) corresponding to the heat-dissipating key KS located on the right side of the top row ROW1 at least partially overlaps the right heat-reducing optical pattern group OPG-R (constituted by the right light-reducing pattern LRP-R and the right diffusion pattern DP-R) of the heat-dissipating key KS located on the left side of the middle row ROW2 in the Y direction. That is, these two partially overlapping heat-reducing optical pattern groups form an alignment line C2. In brief, the alignment line C1 is formed by the right heat-reducing optical pattern group OPG-R of a higher row and the right heat-reducing optical pattern group OPG-R of a lower row, which correspond to two heat-dissipating keys KS being adjacent in the Y direction but not aligned in the X direction; the alignment line C2 is formed by the left heat-reducing optical pattern group OPG-L of a higher row and the right heat-reducing optical pattern group OPG-R of a lower row, which correspond to the two heat-dissipating keys KS that are adjacent in the Y direction but misaligned in the X direction. FIG. 5 shows a special arrangement in which the heat-dissipating keys KS of two adjacent rows in the lighting keyboard LKB are offset by ½ of the key center.

Figure 6:
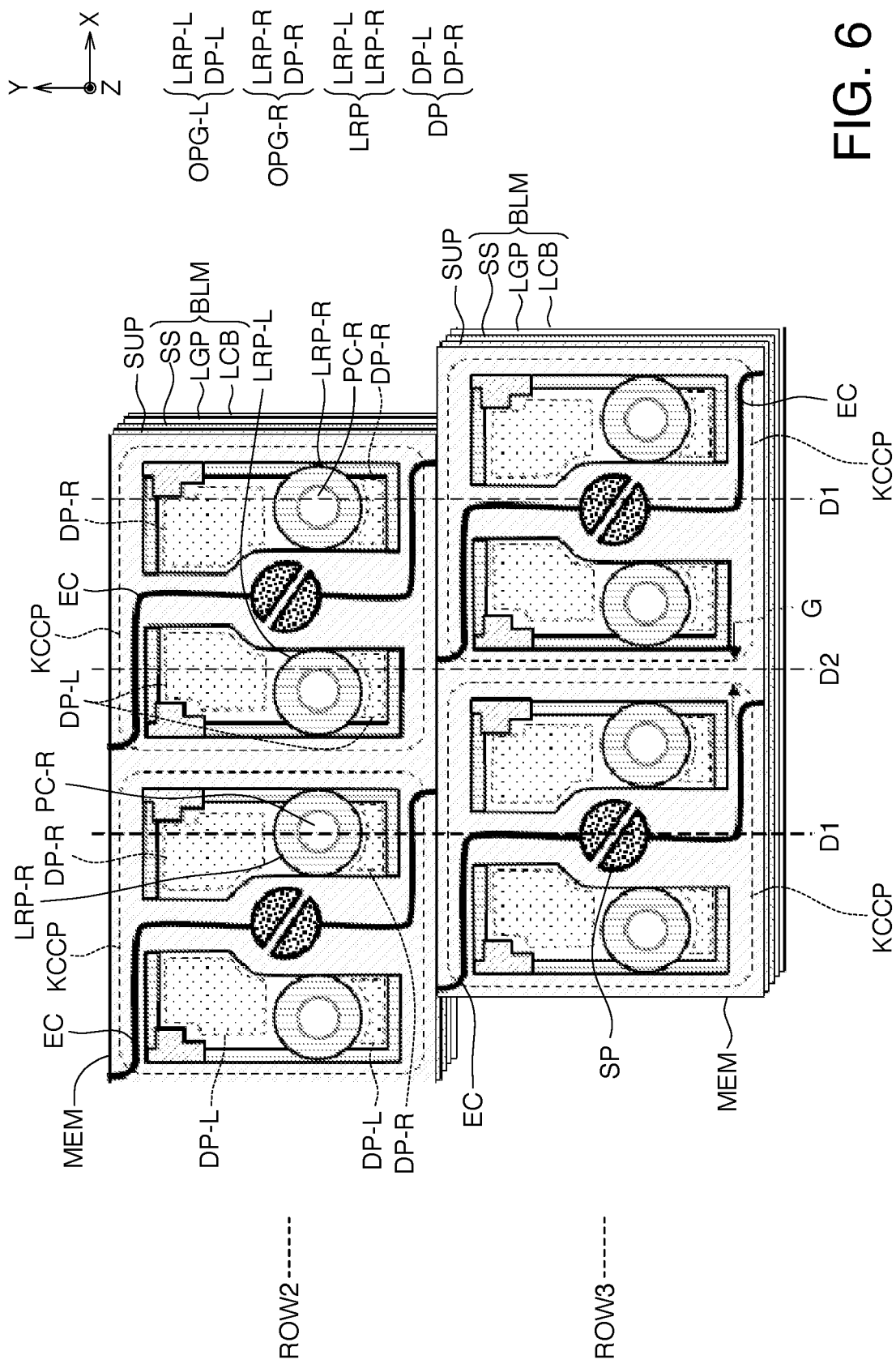
FIG. 6 is a partial top view illustrating the lighting keyboard shown in FIG. 1.

Further referring to FIG. 6, FIG. 6 is a top view illustrating a partial region T3 of the lighting keyboard LKB shown in FIG. 1, wherein the keycap KCC, the support mechanism SSR, the trigger element TE and the restoration member RE are omitted in FIG. 6. The four heat-dissipating keys KS in the partial area T3 can also have all the features described above, which will not repeated herein. The description regarding FIG. 6 mainly focuses on the features of the heat-dissipating keys KS in different rows of the lighting keyboard LKB.

As shown in FIG. 6, the heat-dissipating key KS located on the left side of the middle row ROW2 and the heat-dissipating key KS located on the left side of a bottom row ROW3 are adjacent in the Y direction but not aligned in the X direction; the heat-dissipating key KS located on the right side of the middle row ROW2 and the heat-dissipating key KS located on the right side of the bottom row ROW3 are adjacent in the Y direction but is not aligned in the X direction. The right heat-reducing optical pattern group OPG-R (constituted by the right light-reducing pattern LRP-R and the right diffusion pattern DP-R) corresponding to the heat-dissipating key KS located on the left side of the middle row ROW2 at least partially overlaps the switch pad SP corresponding to the heat-dissipating key KS located on the left side of the bottom row ROW3 in the Y direction. That is, this right heat-reducing optical pattern group and this switch pad SP that partially overlap each other form an alignment line D1. Moreover, the right heat-reducing optical pattern group OPG-R (constituted by the right light-reducing pattern LRP-R and the right diffusion pattern DP-R) corresponding to the heat-dissipating key KS located on the right side of the middle row ROW2 at least partially overlaps the switch pad SP corresponding to the heat-dissipating key KS located on the right side of the bottom row ROW3 in the Y direction. That is, this right heat-reducing optical pattern group and this switch pad SP that partially overlap each other also form the alignment line D1.

Furthermore, the left heat-reducing optical pattern group OPG-L (constituted by the left light-reducing pattern LRP-L and the left diffusion pattern DP-L) corresponding to the heat-dissipating key KS located on the right side of the middle row ROW2 at least partially overlaps a gap region G exterior to the heat-dissipating keys located on the left side or the right side of the bottom row ROW3 in the Y direction. That is, this left heat-reducing optical pattern group and this gap region G that partially overlap each other also form a alignment line D2. In brief, the alignment line D1 is formed by the right heat-reducing optical pattern group OPG-R of a higher row and a switch pad SP of a lower row, which correspond to two heat-dissipating keys KS being adjacent in the Y direction but not aligned in the X direction; the alignment line D2 is formed by the left heat-reducing optical pattern group OPG-L of a higher row and a gap region G of a lower row, which correspond to the two heat-dissipating keys KS that are adjacent in the Y direction but misaligned in the X direction. FIG. 6 shows a special arrangement in which the heat-dissipating keys KS of two adjacent rows in the lighting keyboard LKB are offset by ¼ of the key center.

As mentioned in the above, the invention makes at least one penetration channel on the lighting keyboard and the backlight module therefor. Accordingly, the through-channel can be configured to dissipate heat in the heat region under the heat-dissipating keys, thereby improving the heat dissipation efficiency of the lighting keyboard. Furthermore, the present invention also makes a light-reducing pattern at periphery of the penetration channel to block light and adjacent diffusion patterns for guiding the light to illuminate the heat-dissipating key, so as to enhance the overall illuminating consistency and to solve the problem of the upward or downward light leakage in the penetration channel.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A backlight module for a lighting keyboard, wherein the lighting keyboard includes at least two heat-dissipating keys, and the backlight module comprises:
   a reflective layer;
   a light guide panel configured in optical communication with at least one light emitting unit; and
   a shielding sheet, wherein the reflective layer is disposed below the light guide panel, and the shielding sheet is disposed above the light guide panel;
   wherein, the backlight module has at least two penetration channels symmetrically corresponding to the heat-dissipating keys respectively and penetrating the reflective layer, the light guide panel and the shielding sheet; the at least two penetration channels are respectively provided with one light-reducing pattern at their periphery for blocking light; at least two diffusion patterns are arranged adjacent to the light-reducing patterns for guiding light to illuminate the at least two heat-dissipating keys; the at least two light-reducing patterns and the at least two diffusion patterns form at least two heat-reducing optical pattern groups respectively; and the at least two heat-reducing optical pattern groups respectively corresponding to the at least two heat-dissipating keys have identical patterns.

2. The backlight module according to claim 1, wherein two said diffusion patterns are provided near each of the at least two light-reducing patterns; from a top view, each of the at least two light-reducing patterns is located between its nearby diffusion patterns.

3. The backlight module according to claim 1, wherein two said penetration channels are provided to correspond to each of the at least two heat-dissipating keys; each of the at least two heat-dissipating keys has a keycap projected area; and the heat-reducing optical pattern groups corresponding to each of the at least two heat-dissipating keys are symmetrically located on opposite sides of each of the keycap projected areas.

4. The backlight module according to claim 1, wherein the at least two light-reducing patterns are formed on the shielding sheet or the light guide panel.

5. The backlight module according to claim 1, wherein the at least two diffusion patterns are formed on the light guide panel or the reflective layer.

6. The backlight module according to claim 1, wherein the shielding sheet comprises a light permeable area and a shielding frame surrounding the light permeable area, and the at least two diffusion patterns are configured corresponding to at least two corners of the shielding frame.

7. A lighting keyboard, comprising:
   at least one heat-dissipating key having a keycap projected area;
   a backlight module including a reflective layer, a light guide panel and a shielding sheet, wherein the reflective layer is disposed below the light guide panel; the shielding sheet is disposed above the light guide panel; the light guide panel is configured in optical communication with at least one light emitting unit; the backlight module has at least one penetration channel to correspond to the at least one heat-dissipating key; the at least one penetration channel penetrates the reflective layer, the light guide panel and the shielding sheet; a light-reducing pattern is provided at periphery of the at least one penetration channel for blocking light; and at least one diffusion pattern is provided near the light-reducing pattern for guiding light to illuminate the at least one heat-dissipating key; and
   a key circuit board disposed above the backlight module and including an electric circuit portion, wherein the electric circuit portion extends across a range of the keycap projected area;
   wherein, from a top view, the light-reducing pattern and the at least one diffusion pattern are located on the same side of the electric circuit portion.

8. The lighting keyboard according to claim 7, further comprising:
   a support plate disposed between the key circuit board and the backlight module, wherein the support plate includes a rib portion extending across the range of the keycap projected area;

wherein, from the top view, the light-reducing pattern and the at least one diffusion pattern are located on the same side of the rib portion.

9. The lighting keyboard according to claim 7, wherein two said penetration channels are provided to correspond to the at least one heat-dissipating key; from the top view, the two light-reducing patterns respectively corresponding to the two penetration channels are located on the opposite sides of the electric circuit portion, and the two diffusion patterns respectively corresponding to the two penetration channels are located on the opposite sides of the electric circuit portion.

10. The lighting keyboard according to claim 9, further comprising:
a support plate disposed between the key circuit board and the backlight module, wherein the support plate includes a rib portion extending across the range of the keycap projected area;
wherein, from the top view, the two light-reducing patterns respectively corresponding to the two penetration channels are located on the opposite sides of the rib portion, and the two diffusion patterns respectively corresponding to the two penetration channels are located on the opposite sides of the rib portion.

11. The lighting keyboard according to claim 7, wherein the light-reducing pattern is formed on at least one of the reflective layer, the shielding sheet or the light guide panel.

12. The lighting keyboard according to claim 7, wherein the at least one diffusion pattern is formed on at least one of the light guide panel or the reflective layer.

13. The lighting keyboard according to claim 7, wherein the at least one heat-dissipating key includes a first heat-dissipating key and a second heat-dissipating key being adjacent in a first direction but not aligned in a second direction; the backlight module has two said penetration channels symmetrically corresponding to the first heat-dissipating key and the second heat-dissipating key; the two penetration channels are respectively provided with one right heat-reducing optical pattern group, and each of the right heat-reducing optical pattern groups corresponds to each of the first heat-dissipating key and the second heat-dissipating key; the key circuit board includes two switch pads to correspond to each of the first heat-dissipating key and the second heat-dissipating key; the right heat-reducing optical pattern group corresponding to the first heat-dissipating key at least partially overlaps the switch pad corresponding to the second heat-dissipating key in the first direction.

14. The lighting keyboard according to claim 7, wherein the at least one heat-dissipating key includes a first heat-dissipating key and a second heat-dissipating key being adjacent in a first direction but not aligned in a second direction; the backlight module has two said penetration channels symmetrically corresponding to the first heat-dissipating key and the second heat-dissipating key; the two penetration channels are respectively provided with one left heat-reducing optical pattern group; each of the left heat-reducing optical pattern groups corresponds to each of the first heat-dissipating key and the second heat-dissipating key; the left heat-reducing optical pattern group corresponding to the first heat-dissipating key at least partially overlaps a key gap region exterior to the second heat-dissipating key in the first direction.

15. The lighting keyboard according to claim 13, wherein each of the right heat-reducing optical pattern groups includes one said light-reducing pattern and at least one said diffusion pattern.

16. A backlight module for a lighting keyboard, wherein the lighting keyboard includes a first heat-dissipating key and a second heat-dissipating key, the first heat-dissipating key and the second heat-dissipating key are adjacent in a first direction but not aligned in a second direction, and the backlight module comprises:
a reflective layer;
a light guide panel; and
a shielding sheet, wherein the reflective layer is disposed below, the light guide panel, and the shielding sheet is disposed above the light guide panel;
wherein, the backlight module has two penetration channels symmetrically corresponding to the first heat-dissipating key and the second heat-dissipating key; the two penetration channels penetrate the reflective layer, the light guide panel and the shielding sheet; the two penetration channels are respectively provided with a left heat-reducing optical pattern group and a right heat-reducing optical pattern group at their periphery to correspond to each of the first heat-dissipating key and the second heat-dissipating key;
wherein, the right heat-reducing optical pattern group corresponding to the first heat-dissipating key at least partially overlaps the left heat-reducing optical pattern group corresponding to the second heat-dissipating key in the first direction.

17. The backlight module according to claim 16, wherein each of the first heat-dissipating key and the second heat-dissipating key has a light-reducing pattern and at least one diffusion pattern, and the at least one diffusion pattern is disposed near the light-reducing pattern.

18. The backlight module according to claim 17, wherein each of the light-reducing patterns is formed on at least one of the reflective layer, the shielding sheet or the light guide panel.

19. The backlight module according to claim 17, wherein each of the diffusion patterns is formed on at least one of the light guide panel or the reflective layer.

20. The backlight module according to claim 16, further comprising a lighting board, wherein the reflective layer is configured on top of the lighting board.

* * * * *